(12) United States Patent
Takamatsu

(10) Patent No.: US 8,911,249 B2
(45) Date of Patent: Dec. 16, 2014

(54) CONNECTION CABLE HAVING COVER MEMBER AND LOCKING MEMBER

(71) Applicant: Panasonic Corporation, Osaka (JP)

(72) Inventor: Kenichi Takamatsu, Niigata (JP)

(73) Assignee: Panasonic Corporation, Osaka (JP)

( * ) Notice: Subject to any disclaimer, the term of this patent is extended or adjusted under 35 U.S.C. 154(b) by 33 days.

(21) Appl. No.: 13/747,736

(22) Filed: Jan. 23, 2013

(65) Prior Publication Data

US 2013/0196525 A1    Aug. 1, 2013

(30) Foreign Application Priority Data

Jan. 31, 2012   (JP) ................................. 2012-018897

(51) Int. Cl.
| | | |
|---|---|---|
| H01R 33/02 | (2006.01) | |
| F21S 8/10 | (2006.01) | |
| B60Q 1/00 | (2006.01) | |
| H01R 13/627 | (2006.01) | |

(52) U.S. Cl.
CPC ........... *H01R 13/627* (2013.01); *F21S 48/1109* (2013.01); *B60Q 1/0094* (2013.01); *F21S 48/1186* (2013.01); *H01R 2201/26* (2013.01)
USPC ....................................................... 439/232

(58) Field of Classification Search
USPC ........................ 439/352, 323, 232, 153, 347
See application file for complete search history.

(56) References Cited

U.S. PATENT DOCUMENTS

| | | | |
|---|---|---|---|
| 6,250,943 B1 | 6/2001 | Castle et al. | |
| 7,618,290 B2 | 11/2009 | Van Gennip | |
| 8,512,060 B2 * | 8/2013 | Smith ............................ | 439/323 |
| 2005/0191910 A1* | 9/2005 | Bertini et al. .................. | 439/676 |
| 2010/0221939 A1 | 9/2010 | Fakhri et al. | |
| 2010/0255721 A1* | 10/2010 | Purdy et al. .................... | 439/583 |
| 2012/0156911 A1* | 6/2012 | Smith ............................ | 439/323 |

FOREIGN PATENT DOCUMENTS

| | | |
|---|---|---|
| EP | 1 684 389 | 7/2006 |
| JP | 61-214382 | 9/1986 |
| JP | 2011-043944 | 2/2001 |
| JP | 2001-110525 | 4/2001 |
| JP | 2004-171911 | 6/2004 |
| JP | 2010-073490 | 4/2010 |
| JP | 4560518 | 7/2010 |
| JP | 2010-541188 | 12/2010 |
| WO | 2005/067107 | 7/2005 |
| WO | 2009/047582 | 4/2009 |

OTHER PUBLICATIONS

Search report from E.P.O., mail date is Mar. 13, 2013.

* cited by examiner

*Primary Examiner* — Chandrika Prasad
(74) *Attorney, Agent, or Firm* — Greenblum & Bernstein, P.L.C.

(57) ABSTRACT

A connection cable includes a cable-side connector, a cable body, a cover member, and a locking member. The cover member is configured to define a gap between the cable-side connector and the cover member such that a bulb-side connector is fitted to the gap when the cable-side connector is connected to the bulb-side connector. The locking member includes a slide portion arranged to slide along an outer circumferential surface of the cover member. The slide portion is provided with a protrusion extending through the cover member and engaging with a locking hole formed in the bulb-side connector. The slide portion is configured such that, when the slide portion is caused to slide, the protrusion is moved away from the cable-side connector and disengaged from the locking hole.

6 Claims, 8 Drawing Sheets

CONNECTOR INSERTION DIRECTION

CONNECTOR INSERTION DIRECTION ⊙

CONNECTOR INSERTION DIRECTION ⊗

CONNECTOR INSERTION DIRECTION

CONNECTOR INSERTION DIRECTION

CONNECTOR INSERTION DIRECTION

CONNECTOR INSERTION DIRECTION

CONNECTOR INSERTION DIRECTION

US 8,911,249 B2

CONNECTION CABLE HAVING COVER MEMBER AND LOCKING MEMBER

FIELD OF THE INVENTION

The present invention relates to a connection cable for interconnecting an HID bulb and a lighting circuit in a vehicle-mounted lighting device.

BACKGROUND OF THE INVENTION

In recent years, a vehicle-mounted illumination device using a high intensity discharge lamp (HID lamp) as a light source becomes widespread. The vehicle-mounted illumination device is required to instantaneously start or restart the HID lamp. In general, the vehicle-mounted illumination device includes an ignitor (starter) for generating a high-voltage pulse when starting the HID lamp and an inverter for stably lighting up the HID lamp. Along with the tendency of size reduction, there is available an HID bulb in which an HID lamp and an ignitor are one-piece formed with each other. The HID bulb of the type including an ignitor one-piece formed therewith does not require a voltage of several tens kV as required in a conventional HID lamp and can be turned on and driven with an applied voltage of about 100 V. For that reason, a connection cable provided with a fitting-type connector, which is connected to a typical 12V halogen lamp, is used in connecting the HID bulb to a circuit unit having an inverter and so forth (see, e.g., Japanese Patent Application Publication No. 2010-73490).

The connection cable of this type is shown in FIGS. 9A through 9C. The connection cable 101 is connected to an HID bulb 102 in which an HID lamp 111 and an ignitor 112 are one-piece formed with each other. The connection cable 101 includes a direction-setting member 106 for coupling a cable-side connector 103 and a cable body 104 together. In the connection cable 101, the cable body 104 is arranged to extend in a direction perpendicular to the insertion direction of the cable-side connector 103. The positional relationship between the cable-side connector 103 and the cable body 104 is maintained by the direction-setting member 106 (see FIG. 9A). The direction-setting member 106 includes a claw portion 163 caught in a locking hole 123 formed on the outer circumferential surface of a bulb-side connector 122 of the HID bulb 102 and a lever 161 for lifting up the claw portion 163. The lever 161 is biased in such a state that the end portion thereof opposite to the end portion making contact with the claw portion 163 is lifted upward (see FIG. 9B). If the lever 161 is pushed down against the biasing force, the end portion making contact with the claw portion 163 is lifted up, thereby pulling the claw portion 163 upward (see FIG. 9C). In other words, the bulb-side connector 122 and the connection cable 101 can be detached by pushing the lever 161 downward and disengaging the claw portion 163 from the locking hole 123 formed on the outer circumferential surface of the bulb-side connector 122.

In the connection cable 101 disclosed in Japanese Patent Application Publication No. 2010-73490, however, the lever 161 is kept in a lifted state when the connection is locked. Thus, the lever 161 protrudes outward around the connection region. For that reason, it becomes impossible to secure a space for arrangement of other wiring members. It is sometimes the case that other wiring wires are caught by the protruding lever 161, consequently hindering a wiring work. If the lever 161 is made short, it becomes difficult to apply a leverage force. This makes it difficult to lift up the claw portion 163. On the other hand, if the biasing force of the lever 161 is reduced so that the lever 161 can be pushed down with ease, the claw portion 163 may possibly be disengaged from the locking hole 123 by a vibration or a small impact. It is therefore likely that the connection cable 101 is easily detached from the bulb-side connector 122.

Hooke-shaped protrusion portions for gripping the cable-side connector 103 and the cable body 104 are formed in the direction-setting member 106 at the opposite lateral sides of the lever 161. Thus, the lever 161 is formed of a thin rod-like member to have a reduced arrangement area. For that reason, a worker wearing gloves often feels it difficult to push down the lever 161. This makes it impossible to attach and detach the connection cable with ease.

SUMMARY OF THE INVENTION

In view of the above, the present invention provides a connection cable capable of locking the connection thereof to a bulb-side connector of an HID bulb, capable of being reduced in size so as to secure a space around a connector and capable of being attached and detached with ease.

In accordance with an embodiment of the present invention, there is provided a connection cable for interconnecting a high intensity discharge (HID) bulb and a circuit unit, including: a cable-side connector electrically connected to a bulb-side connector provided in the HID bulb; a cable body connected to the cable-side connector; a cover member configured to surround an outer circumferential surface of the cable-side connector with a connection terminal surface of the cable-side connector kept exposed; and a locking member configured to bring the cover member into engagement with the cable-side connector, wherein the cover member is configured to define a gap between the cable-side connector and the cover member such that the bulb-side connector is fitted to the gap when the cable-side connector is connected to the bulb-side connector, the locking member includes a slide portion arranged to slide along an outer circumferential surface of the cover member, the slide portion provided with a protrusion extending through the cover member and engaging with a locking hole formed in the bulb-side connector, and the slide portion is configured such that, when the slide portion is caused to slide, the protrusion is moved away from the cable-side connector and disengaged from the locking hole.

The slide portion may be split by an incision extending along a slide direction of the slide portion into a flexing piece which is flexed, during sliding movement of the slide portion, to displace the protrusion and a guide piece which is slid along the outer circumferential surface of the cover member without being flexed during the sliding movement of the slide portion. The guide piece may include a crook protruding into the gap through the cover member. The cover member may include a guide groove formed to extend along the slide direction of the slide portion. The guide groove may be configured to guide the crook.

The flexing piece may include a slant bump protruding into the gap through the cover member and having an obliquely extending surface, the cover member including a slant guide piece formed on the outer circumferential surface of the cover member on which the slide portion is arranged, the slant guide piece obliquely protruding into the gap to hold the slant bump, each of the slant bump and the slant guide piece having a slope gradually decreasing in the slide direction of the slide portion, the slide portion configured such that the flexing piece is flexed away from the cover member as the slant bump is obliquely slid along the slant guide piece.

The locking member may be made of an elastic flat panel, the locking member including a bent portion extending from the slide portion in a direction opposite to the slide direction of the slide portion and bent in a position spaced apart from the cover member, the bent portion having a distal end engaging with the outer circumferential surface of the cover member.

The slide portion may be configured to slide in a direction orthogonal to an insertion direction of the cable-side connector.

The cover member may include a spring piece protruding into the gap to press an outer circumferential surface of the bulb-side connector, the slide portion having a cutout or a hole through which the spring piece is exposed.

With such configuration, if the slide portion of the locking member is caused to slide, the protrusion is moved to thereby release the engagement of the protrusion and the locking hole. This makes it possible to easily attach and detach the cable. Since the slide portion is slid along the outer circumferential surface of the cover member and since the slide portion protrudes outward by a small amount, it is possible to reduce the size of the circumference of the connector.

BRIEF DESCRIPTION OF THE DRAWINGS

The objects and features of the present invention will become apparent from the following description of embodiments, given in conjunction with the accompanying drawings, in which.

DETAILED DESCRIPTION OF THE PREFERRED EMBODIMENTS

Figure 1:
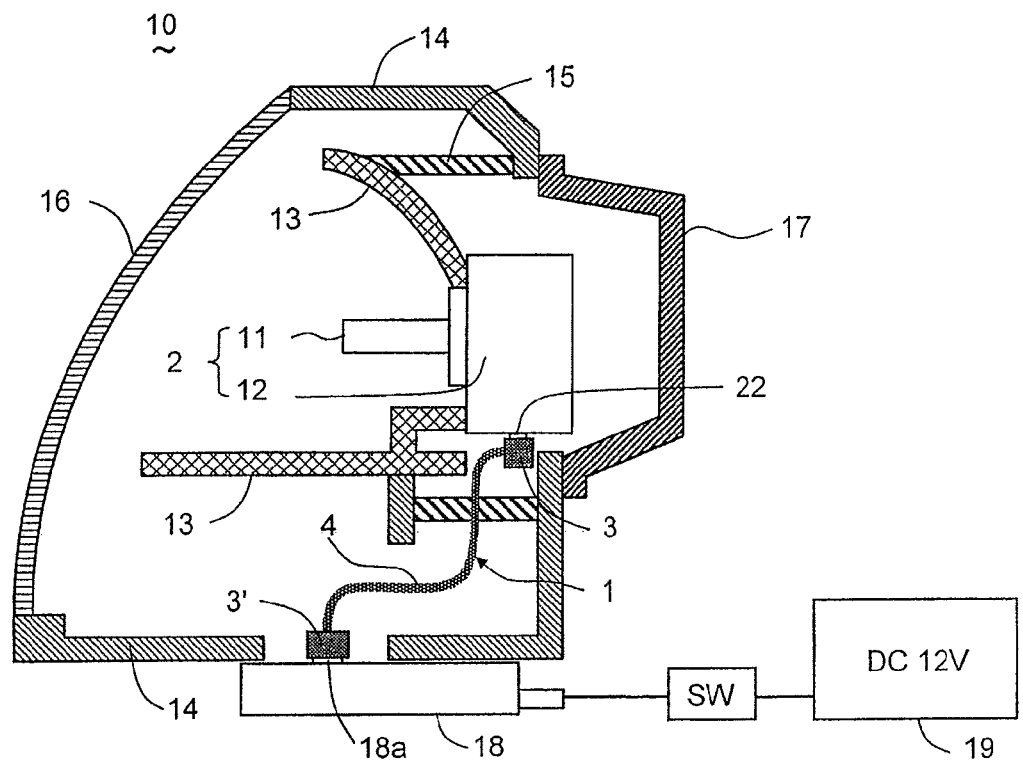
FIG. 1 is a partial side section view showing a vehicle-mounted illumination device employing a connection cable according to one embodiment of the present invention.

A connector according to one embodiment of the present invention and a connection cable for lamps employing the connector will now be described with reference to FIGS. 1 through 8B. The following description will be made on the basis of a configuration in which a connection cable 1 of the present embodiment is attached to a vehicle-mounted illumination device 10 as shown in FIG. 1.

The vehicle-mounted illumination device 10 includes a HID bulb 2 in which a high intensity discharge lamp (an HID lamp 11) and an ignitor 12 are one-piece formed with each other, a reflecting mirror 13 for controlling distribution of the light emitted from the HID lamp 11 and a light housing 14 for accommodating the HID bulb 2 and the reflecting mirror 13. The reflecting mirror 13 is fixed to the light housing 14 by an optical-axis adjusting screw 15. The light housing 14 has a light emission surface through which the light of the HID lamp 11 is emitted. A transparent light lens 16 is arranged on the light emission surface. The light housing 14 has an opening formed at the rear side of the HID bulb 2. The HID bulb 2 is taken out through the opening when the HID lamp 11 is replaced. The opening is normally closed by a lamp replacing cap 17. The vehicle-mounted illumination device 10 further includes a circuit unit 18 having an inverter for stably turning on the HID lamp 11. The circuit unit 18 is arranged outside the light housing 14 and is supplied with electric power from a vehicle battery 19 (DC 12 V) through a switch SW. The connection cable 1 is used in interconnecting the HID bulb 2 and the circuit unit 18.

A mercury lamp or a metal halide lamp is used as the HID lamp 11. As one example of the HID lamp 11, there is available a cantilevered discharge lamp that includes a light-emitting tube filled with, e.g., mercury, a halogen gas or other inert gases, a pair of electrodes arranged within the light-emitting tube in a spaced-apart relationship, and an end cap member to which the rear end of the light-emitting tube is fixedly secured. In the vehicle-mounted illumination device 10, an electric current of 12 V is supplied from the battery 19 to the inverter of the circuit unit 18 as the switch SW is turned on.

The inverter boosts the battery voltage and supplies the ignitor 12 with an electric current of specified voltage capable of enabling the ignitor 12 to generate a startup pulse. In the HID bulb 2 supplied with the electric current, a high-voltage current of 25 kV required to break down the HID lamp 11 is supplied from the ignitor 12 to the HID lamp 11. After arc discharge is generated within the HID lamp 11, the electric power is continuously fed from the inverter to the HID lamp 11.

Figure 2:
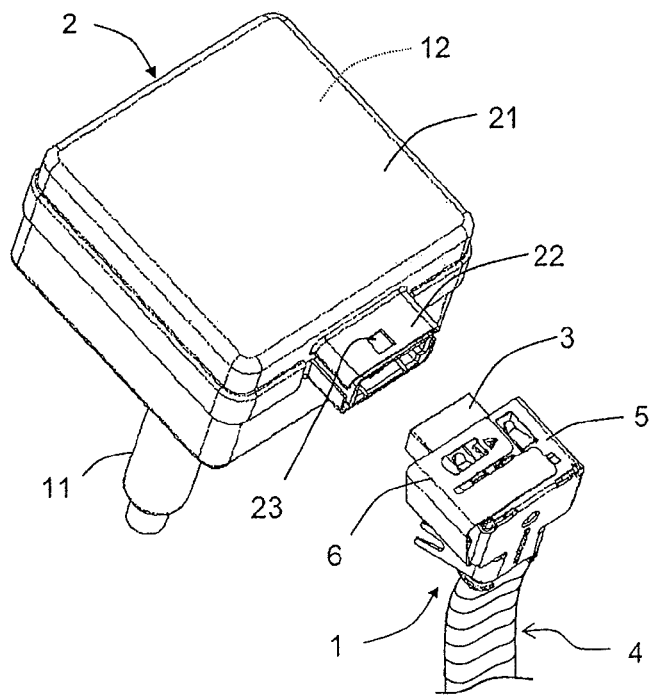
FIG. 2 is a perspective view showing the connection cable and a HID bulb connected to the connection cable.

As shown in FIG. 2, the HID bulb 2 includes, in addition to the HID lamp 11, a bulb housing 21 for accommodating the ignitor 12 and a bulb-side connector 22 protruding from the side surface of the bulb housing 21. A locking hole 23 with which a below-mentioned protrusion portion 63 engages is formed on the outer circumferential surface of the bulb-side connector 22.

Figure 3A:
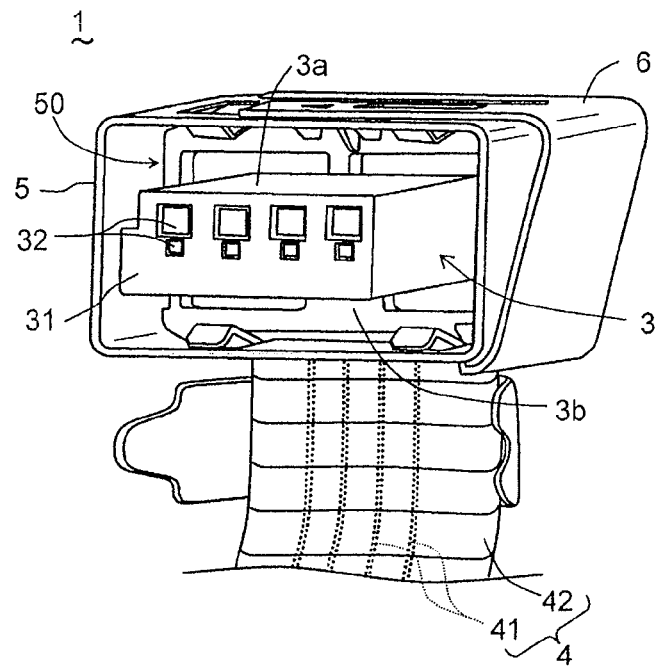
FIG. 3A is a perspective view of the connection cable and FIG. 3B is a side section view of the connection cable.
Figure 3B:
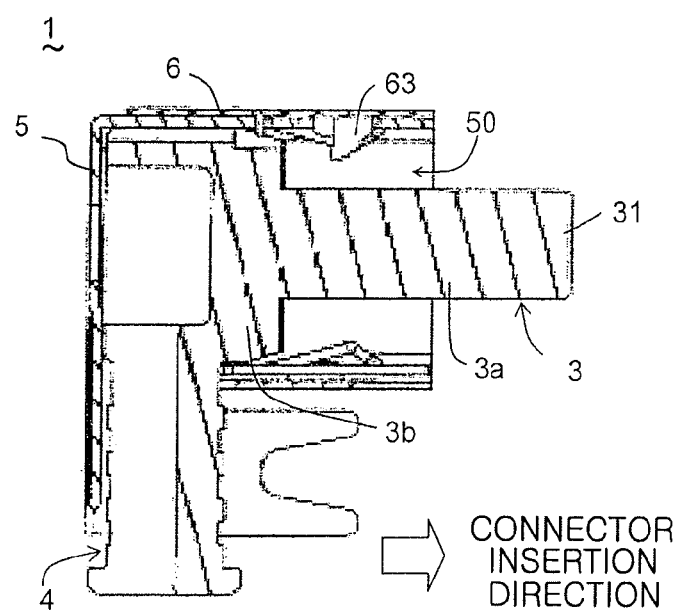
Figure 4A:
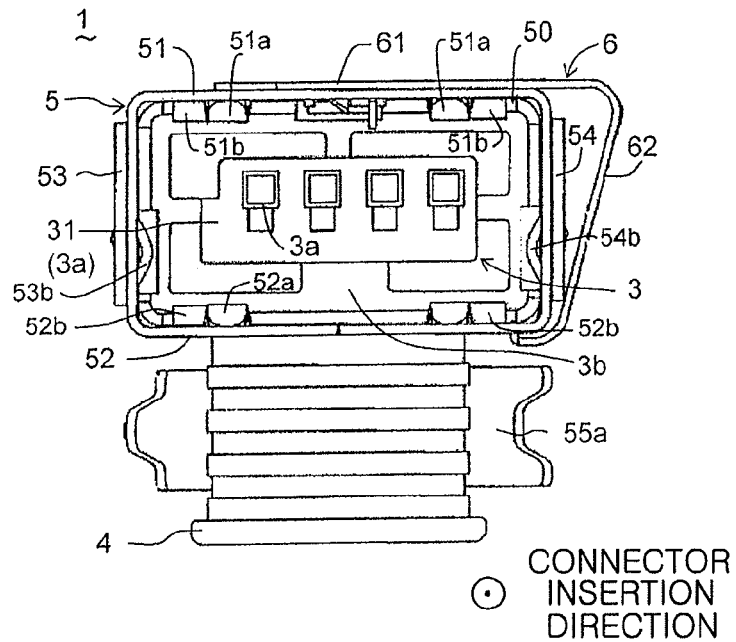
FIG. 4A is a front view of the connection cable and FIG. 4B is a rear view of the connection cable.
Figure 4B:
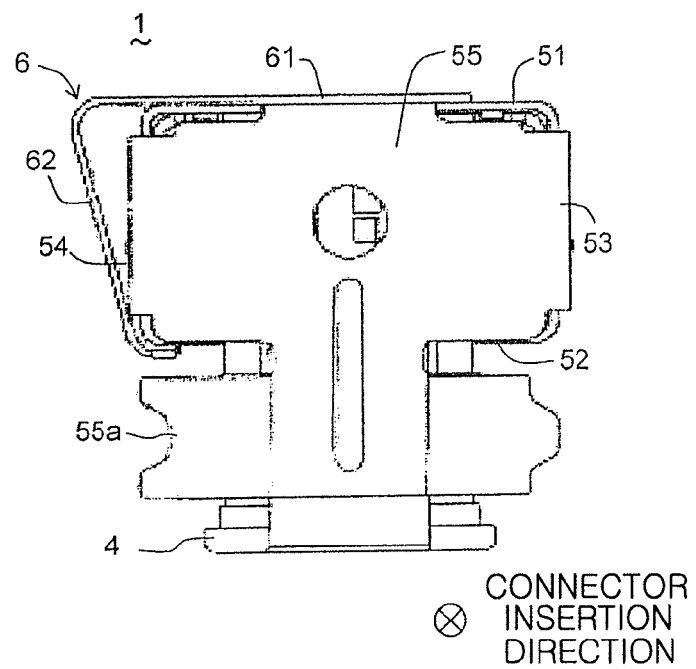

As shown in FIGS. 3A and 3B, the connection cable 1 includes a cable-side connector 3 electrically connected to the bulb-side connector 22 of the HID bulb 2 and a cable body 4 connected to the cable-side connector 3. An additional connector 3' connected to a circuit-side connector 18a of the circuit unit 18 (see FIG. 1) is provided in the end portion of the cable body 4 opposite to the end portion of the cable body 4 provided with the cable-side connector 3. The additional connector 3' may have the same configuration as the cable-side connector 3 or may differ in configuration from the cable-side connector 3.

The connection cable 1 includes, in addition to the cable-side connector 3 and the cable body 4, a cover member 5 for surrounding the outer circumferential surface of the cable-side connector 3 with a connection terminal surface 31 of the cable-side connector 3 exposed to the outside and a locking member 6 for bringing the cover member 5 into engagement with the bulb-side connector 22.

The cable-side connector 3 is formed of a resin member. Assuming that the connection terminal surface 31 is a front end portion 3a and the portion opposite to the connection terminal surface 31 is a rear end portion 3b, the cable-side connector 3 is formed into a step-like shape such that the cross-sectional area of the front end portion 3a in the direction orthogonal to the connector insertion direction grows smaller while the cross-sectional area of the rear end portion 3b grows larger. A plurality of holes 32, into which the connection terminals (not shown) of the bulb-side connector 22 are inserted, is formed on the connection terminal surface 31 positioned in the front end portion 3a of the cable-side connector 3. Connection terminals (not shown) making contact with the connection terminals of the bulb-side connector 22 are arranged within the holes 32. In the illustrated example, four pin-shaped connection terminals of the bulb-side connector 22 are configured to grip the connection terminals of the cable-side connector 3 when the pin-shaped connection terminals are inserted into the holes 32.

The cable body 4 includes a plurality of lead wires 41 and a mesh 42 for protecting the lead wires 41. The respective lead wires 41 are connected one by one to the connection terminals of the cable-side connector 3 at the rear end side of the cable-side connector 3.

As shown in FIGS. 4A to 5B, the cover member 5 is opened on one surface so as the expose the connection terminal surface 31 of the cable-side connector 3. The cover member 5 includes a top portion 51, a bottom portion 52, opposite side portions 53 and 54, and a rear portion 55. The top portion 51, the bottom portion 52, the side portions 53 and 54 and the rear portion 55 are formed by cutting a piece of metal and are folded into a box-like shape. The top portion 51, the bottom portion 52 and the side portions 53 and 54 are configured to define a gap 50 between the cable-side connector 3 and the cover member 5 so that the bulb-side connector 22 can be fitted to the gap 50 when the bulb-side connector 22 is connected to the cable-side connector 3 (see FIG. 3B). The top portion 51 and the bottom portion 52 are respectively provided with spring pieces 51a and 52a protruding into the gap 50 and pressing the outer circumferential surface of the bulb-side connector 22. The spring pieces 51a and 52a are formed by cutting and bending the top portion 51 and the bottom portion 52.

Lugs 51b, 52b, 53b and 54b are respectively formed on the surfaces of the top portion 51, the bottom portion 52 and the side portions 53 and 54 facing toward the gap 50. The lugs 51b, 52b, 53b and 54b are caught in the rear end portion 3b of the cable-side connector 3, whereby the cable-side connector 3 and the cover member 5 are fixed to each other.

The bottom portion 52 has a drawer hole (not shown) through which the lead wire 41 is drawn out from the cover member 5. The rear portion 55 includes an enlarged section 55a extending in the lead wire drawing-out direction and getting enlarged in the direction orthogonal to the extension direction. The enlarged portion 55a ties up the mesh 42 for protecting the lead wire and strongly interconnects the cable-side connector 3 and the cable body 4.

The locking member 6 is an elastic flat panel that includes a slide portion 61 arranged to slide along the outer circumferential surface (the upper surface 51) of the cover member 5 and a bent portion 62 extending in the direction opposite to the slide direction and bent in a position spaced apart from the cover member 5. The bending angle of the bent portion 62 with respect to the slide portion 61 is preferably from 70 to 80 degrees, which is an acute angle a little smaller than a right angle. In the illustrated example, the slide portion 61 is slid in a direction orthogonal to the insertion direction of the cable-side connector 3.

Figure 6A:
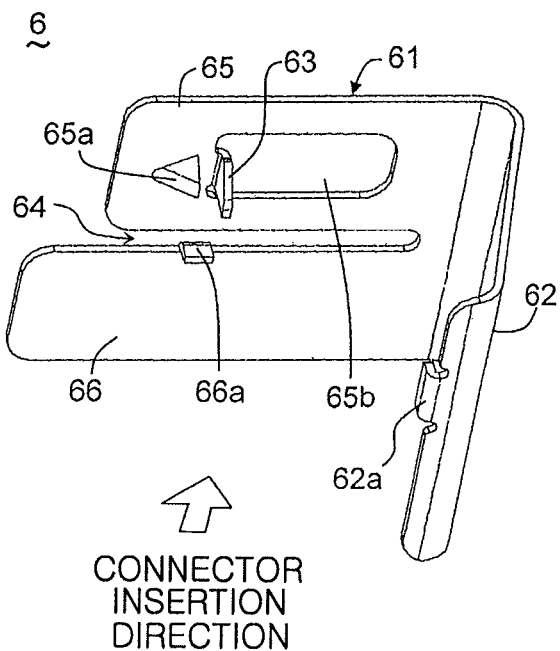
FIG. 6A is a perspective view of the locking member used in the connection cable and FIG. 6B is a front view of the locking member.
Figure 6B:
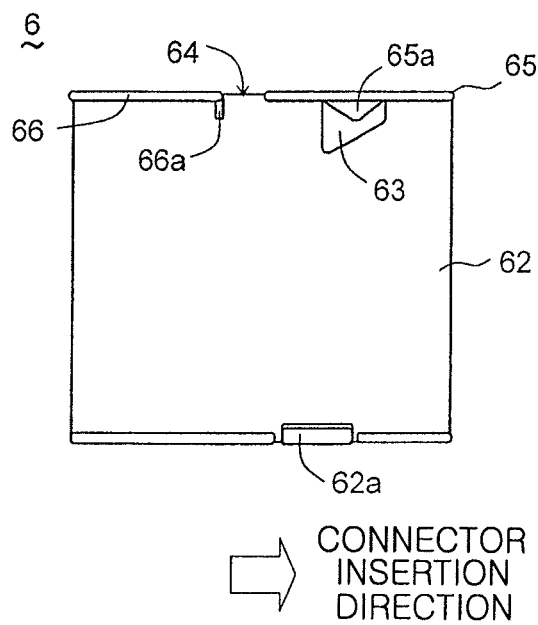

As shown in FIGS. 6A and 6B, the locking member 6 includes a protrusion 63 formed in the slide portion 61 to protrude toward the gap 50 through the top portion 51 of the cover member 5. When the cable-side connector 3 is connected to the bulb-side connector 22, the protrusion 63 engages with the locking hole 23 formed in the bulb-side connector 22 (see FIG. 2). The protrusion 63 is bent into the gap 50 such that the top portion 51 of cover member 5 becomes parallel to the insertion direction of the cable-side connector 3. The protrusion 63 is inclined so that the protruding amount thereof toward the rear side in the insertion direction of the cable-side connector 3 can grow larger (see FIG. 3B).

The slide portion 61 is split into two pieces by an incision 64 extending along the slide direction thereof. One of the two pieces split by the incision 64 becomes a flexing piece 65 that is flexed to displace the protrusion 63 when the slide portion 61 makes sliding movement. The other piece becomes a guide piece 66 that slides along the top portion 51 of the cover member 5 without being flexed during the sliding movement. The guide piece 66 includes a crook 66a extending into the gap 50 through the top portion 51 of the cover member 5. The flexing piece 65 includes a slant bump 65a protruding into the gap 50 through the top portion 51 of the cover member 5. The slant bump 65a has an obliquely extending surface.

The slide portion 61 (the flexing piece 65) is cut to have a length smaller than the length of the guide piece 66 so as to expose the spring pieces 51a formed in the top portion 51 of the cover member 5. A hole 65b is formed in the flexing piece 65. When the bulb-side connector 22 is connected to the cable-side connector 3, the spring pieces 51a are lifted up by the outer circumferential surface of the bulb-side connector 22. Thus, the tip end portions of the spring pieces 51a protrude slightly outward beyond the cover member 5 (see FIGS. 4A and 5A). In the present embodiment, the slide portion 61 is formed to expose the spring pieces 51a formed in the top portion 51 of the cover member 5. Therefore, the slide portion 61 does not become an obstacle even when the spring pieces 51a are lifted up. For that reason, the number of the spring pieces 51a need not be reduced in order to install the slide portion 61. This makes it possible stably hold the cover member 5 and the bulb-side connector 22. The cover member 5 serves as a noise shield for shielding an unnecessary radiation noise radiated from the bulb-side connector 22. With the present embodiment, there is no need to reduce the number of the spring pieces 51a. This makes it possible to secure a necessary number of contact points between the bulb-side connector 22 and the cover member 5 and to effectively suppress generation of an unnecessary radiation noise.

The bent portion 62 includes an engaging claw 62a formed in the end portion thereof. The engaging claw 62a engages with an engaging groove 52c (see FIG. 7A) formed in the region of the bottom portion 52 of the cover member 5 near the side portion 54. Since the slide portion 61 is bent in one end thereof extending outward away from the cover member 5, the bent portion 62 is inclined with respect to the side portion 54 of the cover member 5.

Figure 5A:
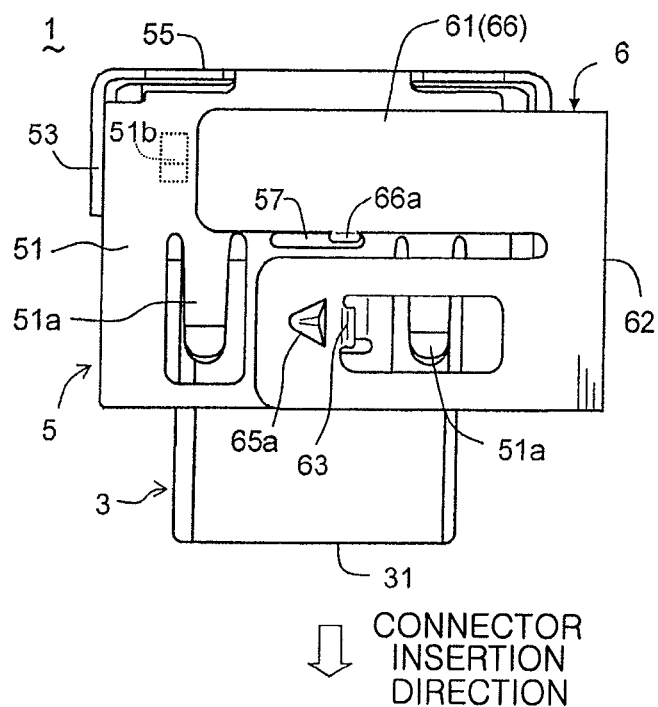
FIG. 5A is a plan view of the connection cable and FIG. 5B is a plan view of the connection cable with a locking member removed.
Figure 5B:
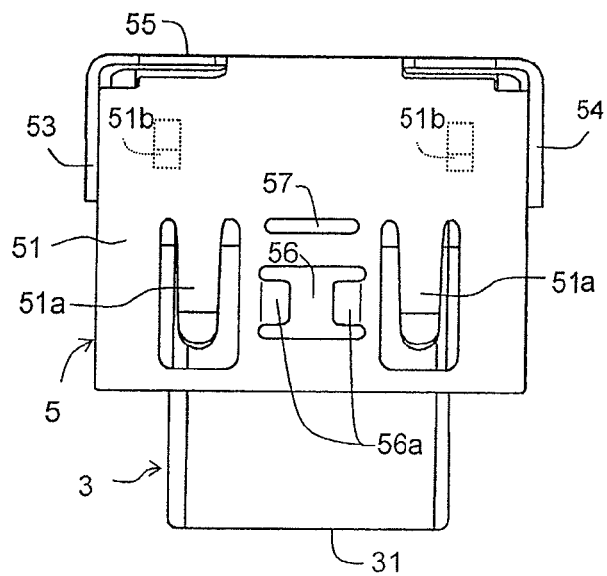

As shown in FIG. 5B, the top portion 51 of the cover member 5 includes an opening 56 into which the protrusion 63 is inserted and a guide groove 57 formed along the slide direction of the slide portion 61 to guide the crook 66a. The opening 56 is formed by cutting the top portion 51 into a rectangular shape. The opening 56 is formed to have slots at the opposite ends thereof in the slide direction. The opposite end portions of the opening 56 are bent so as to obliquely protrude into the gap 50, thereby forming slant guide pieces 56a for holding the slant bump 65a of the locking member 6 (the flexing piece 65). The slant bump 65a and the slant guide pieces 56a are formed so as to have a slope gradually decreasing in the slide direction of the slide portion 61.

Figure 7A:
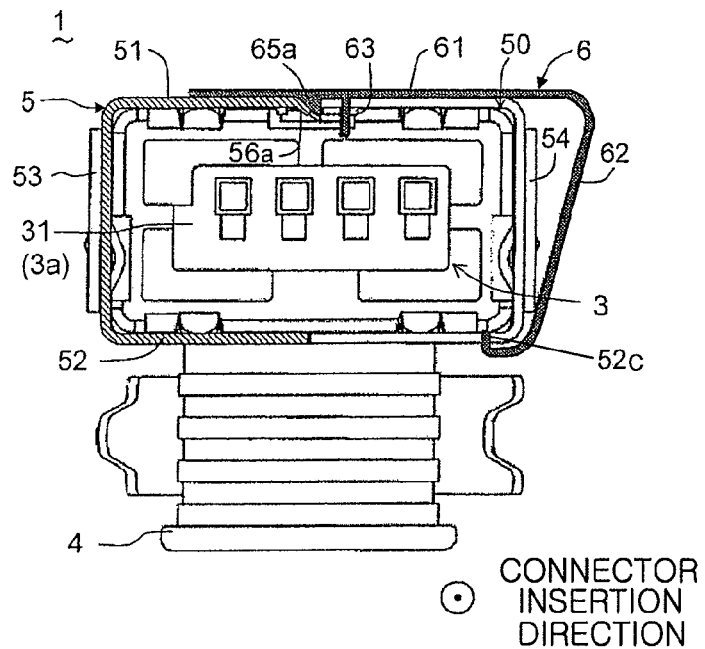
FIGS. 7A and 7B are front views for explaining the operation of the connection cable.
Figure 7B:
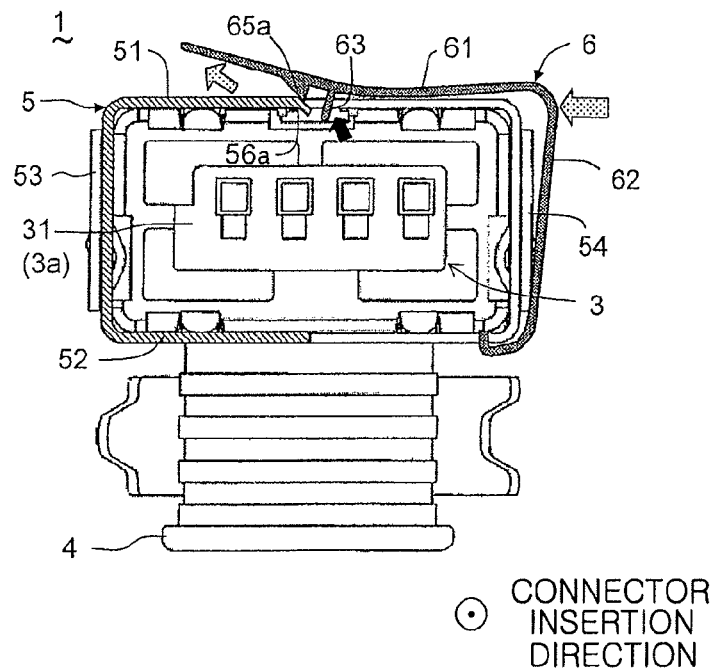

The operation of the connection cable 1 configured as above will be described with reference to FIGS. 7A to 8B. As shown in FIG. 7A, the locking member 6 is biased in such a state that the protrusion 63 protrudes into the gap 50 with the bent portion 62 spaced apart from the side portion 54 of the cover member 5 by a specified distance. If the bent portion 62 is pressed toward the side portion 54 of the cover member 5 against the biasing force as shown in FIG. 7B, the slide portion 61 is slid along the top portion 51 of the cover member 5. At this time, the crook 66a of the slide portion 61 (the guide piece 66) is guided along the guide groove 57. Therefore, even if the pushing force applied to the bent portion 62 is slightly deviated from the slide direction, it is possible to have the slide portion 61 stably slide without deforming the slide portion 61 (see FIG. 5A). Accordingly, even if a worker who attempts to release the locking by groping the locking member 6 during a lamp replacement process does not know the right slide direction of the slide portion 61, there is no possibility that the slide portion 61 is moved in a wrong direction in which the protrusion 63 may be broken. This makes it possible to prevent the locking member 6 from getting damaged.

The slant bump 65a of the slide portion 61 (the flexing piece 65) is slid along the slant guide pieces 56a formed in the top portion 51 of the cover member 5. Since the slant bump 65a and the slant guide pieces 56a are formed so as to have a slope gradually decreasing in the slide direction of the slide portion 61, the slant bump 65a is obliquely slid along the slant guide pieces 56a, whereby the flexing piece 65 is flexed away from the cover member 5. For that reason, when the bent portion 62 is pushed inward and the slide portion 61 is caused to slide, the protrusion 63 of the flexing piece 65 is moved away from the cable-side connector 3. In other words, if the slide portion 61 of the locking member 6 is caused to slide, the protruding amount of the protrusion 63 into the gap 50 grows smaller.

Figure 8A:
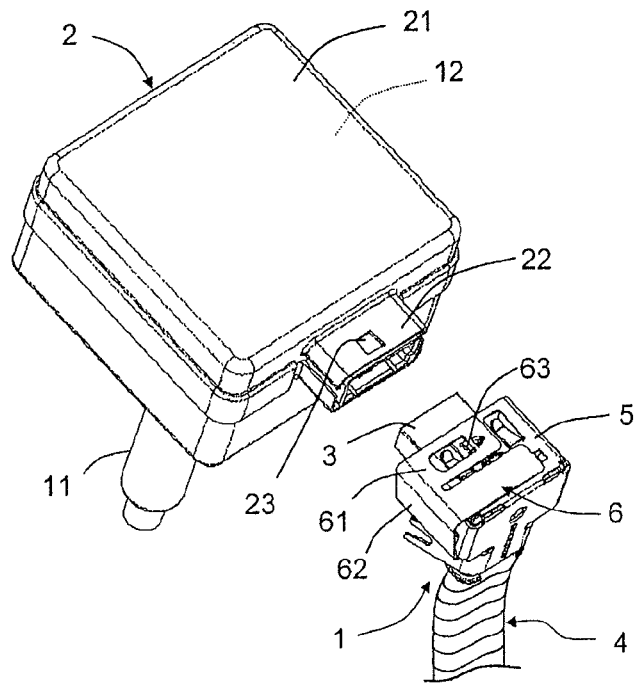
FIGS. 8A and 8B are perspective views for explaining the order of connecting the connection cable to a bulb-side connector of an HID bulb.
Figure 8B:
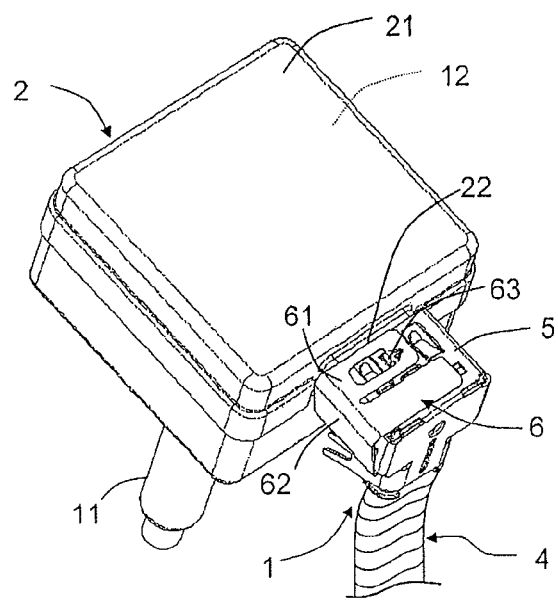
Figure 9A:
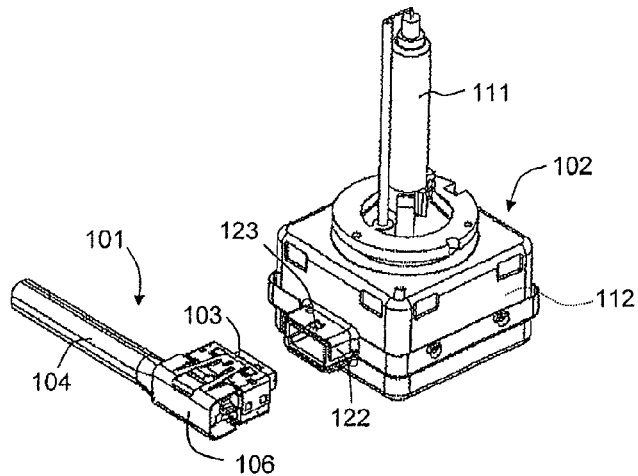
FIG. 9A is a perspective view showing a conventional connection cable and an HID bulb connected to the connection cable and FIGS. 9B and 9C are enlarged side section views of a connection portion thereof.
Figure 9B:
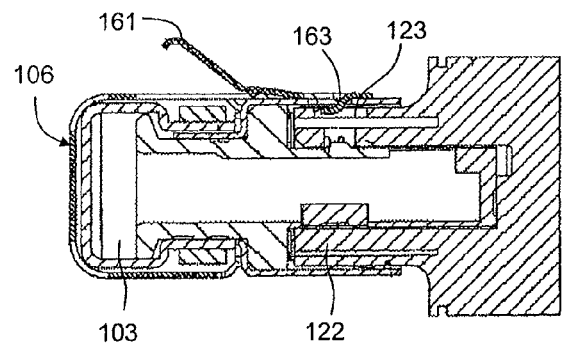
Figure 9C:
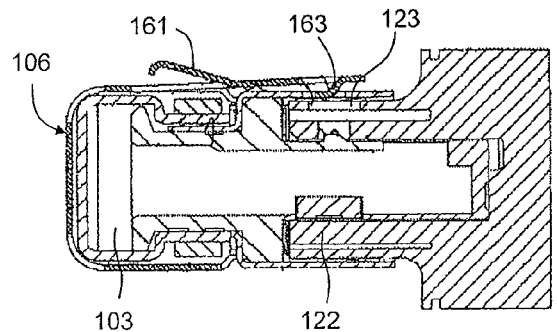

Accordingly, when an attempt is made to connect the connection cable 1 to the HID bulb 2 as shown in FIG. 8A, a worker reduces the protruding amount of the protrusion 63 by pushing the bent portion 62 inward and causing the slide portion 61 of the locking member 6 to slide (see FIG. 7B). In this state, the cable-side connector 3 is inserted into the bulb-side connector 22, thereby interconnecting the cable-side connector 3 and the bulb-side connector 22. If the worker removes his or her hand, the slide portion 61 of the locking member 6 is returned back to the original position by the biasing force thereof (see FIG. 7A). At this moment, the protrusion 63 comes into engagement with the locking hole 23 of the bulb-side connector 22. Accordingly, as shown in FIG. 8B, the connection cable 1 is connected to the bulb-side connector 22. When the connection cable 1 is removed from the bulb-side connector 22, the worker pushes the bent portion 62 inward and causes the slide portion 61 of the locking member 6 to slide. This makes it possible to release the engagement of the protrusion 63 and the locking hole 23. In other words, when the slide portion 61 is caused to slide, the protrusion 63 is moved away from the cable-side connector 3, thereby releasing the engagement of the protrusion 63 and the locking hole 23.

With the connection cable 1 of the present embodiment described above, the connection of the HID bulb 2 to the bulb-side connector 22 can be locked by bringing the protrusion 63 of the locking member 6 into engagement with the locking hole 23 of the bulb-side connector 22. In addition, the engagement of the protrusion 63 and the locking hole 23 can be released by causing the slide portion of the locking member 6 to slide and moving the protrusion 63. Thus, the worker can easily attach and detach the connection cable 1 to and from the bulb-side connector 22 by causing the slide portion 61 to slide.

Since the slide portion 61 is slid along the outer circumferential surface of the cover member 5 and since the slide portion 61 protrudes away from the cover member 5 by a small amount, it is possible to reduce the size of the circumference of the connector. The flexing piece 65 is flexed away from the cover member 5 only when the locking is released. When the connection cable 1 is connected (when the locking is valid), the flexing piece 65 makes contact with the top portion 51 of the cover member 5 and does not protrude away from the top portion 51 of the cover member 5. Accordingly, a space for accommodating other wiring devices can be easily provided around the connection region where the bulb-side connector 22 and the cable-side connector 3 are connected to each other. Since the bent portion 62 can be pushed inward and the slide portion 61 can be caused to slide by gripping the connection cable 1 with the fingers of a worker, it is possible to efficiently perform the task of attaching and detaching the connectors.

The bent portion 62 of the locking member 6 has a distal end (an engaging claw 62a) engaging with the outer circumferential surface of the cover member 5. Thus, the bent portion 62 is bulged outward from the cover member 5. For that reason, the bent portion 62 serves as an operation button for causing the slide portion 61 to slide. Unlike the conventional rod-shaped thin lever, the locking member 6 of the present embodiment enables a worker wearing gloves to easily perform the push-in operation. Since the slide portion 61 is slid in the direction orthogonal to the insertion direction of the cable-side connector 3, it is possible to reduce the thickness of the locking member 6 in the insertion direction and to reduce the size of the circumference of the connector.

The present invention is not limited to the embodiment described above but may be modified in many different forms. In the present embodiment, there is illustrated a configuration in which the cable body 4 is led out from the bottom portion 52 of the cover member 5 to extend in the direction orthogonal to the insertion direction of the cable-side connector 3. Alternatively, it may be possible to employ, e.g., a configuration in which the cable body 4 is led out from the bottom portion 52 of the cover member 5 to extend along the insertion direction of the cable-side connector 3. In addition, the cable body 4 may be led out from, e.g., the side portion 53 of the cover member 5. In this case, the bent portion 62 of the locking member 6 may be arranged in an opposing relationship with the rear portion 55 and the slide portion 61 may be arranged so as to slide along the insertion direction of the cable-side connector 3.

In case where the cable body 4 is led out from, e.g., the other side portion 54 of the cover member 5, the bent portion 62 of the locking member 6 is arranged in an opposing relationship with the side portion 53. If the opening 56, the slant guide pieces 56a and the guide groove 57 of the top portion 51 are formed in a symmetrical relationship with respect to an axis extending in the insertion direction of the cable-side connector 3, it is possible to use the same cover member 5 as employed in the foregoing embodiment. It is also possible to use the locking member 6 formed in a mirror image symmetry.

While the invention has been shown and described with respect to the embodiments, it will be understood by those skilled in the art that various changes and modification may be made without departing from the scope of the invention as defined in the following claims.

What is claimed is:

1. A connection cable for interconnecting a high intensity discharge (HID) bulb and a circuit unit, comprising:

a cable-side connector electrically connected to a bulb-side connector provided in the HID bulb;

a cable body connected to the cable-side connector;

a cover member configured to surround an outer circumferential surface of the cable-side connector with a connection terminal surface of the cable-side connector exposed; and a locking member configured to bring the cover member into engagement with the bulb-side connector, wherein the cover member is configured to define a gap between the cable-side connector and the cover member such that the bulb-side connector is fitted to the gap when the cable-side connector is connected to the bulb-side connector, the locking member includes a slide portion arranged to slide along an outer circumferential surface of the cover member, the slide portion is provided with a protrusion extending through the cover member and engaging with a locking hole provided in the bulb-side connector, and the slide portion is configured such that, when the slide portion is caused to slide, the protrusion is moved away from the cable-side connector and disengaged from the locking hole.

2. The connection cable of claim 1, wherein the slide portion is split by an incision extending along a slide direction of the slide portion into a flexing piece which is flexed, during a sliding movement of the slide portion, to displace the protrusion and a guide piece which is slid along the outer circumferential surface of the cover member without being flexed during the sliding movement of the slide portion, the guide piece includes a crook protruding into the gap through the cover member, the cover member includes a guide groove that extends along the slide direction of the slide portion, and the guide groove is configured to guide the crook.

3. The connection cable of claim 2, wherein the flexing piece includes a slant bump protruding into the gap through the cover member and having an obliquely extending surface, the cover member includes a slant guide piece provided on the outer circumferential surface of the cover member on which the slide portion is arranged, the slant guide piece obliquely protrudes into the gap to hold the slant bump, each of the slant bump and the slant guide piece have a slope gradually decreasing in the slide direction of the slide portion, and the slide portion is configured such that the flexing piece is flexed away from the cover member as the slant bump is obliquely slid along the slant guide piece.

4. The connection cable of claim 1, wherein the locking member is made of an elastic flat panel, the locking member includes a bent portion extending from the slide portion in a direction opposite to the slide direction of the slide portion and bent in a position spaced apart from the cover member, and the bent portion has a distal end engaging with the outer circumferential surface of the cover member.

5. The connection cable of claim 1, wherein the slide portion is configured to slide in a direction orthogonal to an insertion direction of the cable-side connector.

6. The connection cable of claim 1, wherein the cover member includes a spring piece protruding into the gap to press an outer circumferential surface of the bulb-side connector, and the slide portion has one of a cutout or a hole through which the spring piece is exposed.

* * * * *